US012670415B2

(12) United States Patent
Amrani et al.

(10) Patent No.: US 12,670,415 B2
(45) Date of Patent: Jun. 30, 2026

(54) VISUAL QUESTION ANSWERING USING MODEL TRAINED ON UNLABELED VIDEOS

(71) Applicant: International Business Machines Corporation, Armonk, NY (US)

(72) Inventors: Elad Amrani, Zikhron Yaakov (IL); Rami Ben-Ari, Kiryat-Ono (IL); Daniel Nechemia Rotman, Haifa (IL); Udi Barzelay, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 17/008,005

(22) Filed: Aug. 31, 2020

(65) Prior Publication Data

US 2022/0067546 A1 Mar. 3, 2022

(51) Int. Cl.
| | |
|---|---|
| *G06N 5/04* | (2023.01) |
| *G06F 18/21* | (2023.01) |
| *G06N 3/08* | (2023.01) |
| *G06V 20/40* | (2022.01) |
| *G10L 15/26* | (2006.01) |

(52) U.S. Cl.
CPC ............. *G06N 5/04* (2013.01); *G06F 18/217* (2023.01); *G06N 3/08* (2013.01); *G06V 20/46* (2022.01); *G10L 15/26* (2013.01)

(58) Field of Classification Search
CPC ............ G06N 5/04; G06N 3/08; G06N 3/088; G06N 20/00; G06N 5/022; G06N 5/02; G06N 3/096; G06N 5/00; G06N 5/041; G06N 3/091; G06N 3/09; G06N 5/025; G06N 3/006; G06F 18/217; G06F 40/216; G06F 40/30; G06F 40/35; G06V 20/46; G06V 10/764; G10L 15/26
See application file for complete search history.

(56) References Cited

U.S. PATENT DOCUMENTS

2022/0044105 A1 2/2022 Amrani et al.

FOREIGN PATENT DOCUMENTS

CN 110704601 A 1/2020

OTHER PUBLICATIONS

Chen et al., ABC-CNN: An Attention Based Convolutional Neural Network for Visual Question Answering, arXiv: 1511.05960v2 [cs.CV], (2016), 1-10.*
Miech et al., HowTo100M: Learning a Text-Video Embedding by Watching Hundred Million Narrated Video, ICCV Computer Vision Foundation, (2019), 2630-2640.*
Antol et al., VQA: Visual Question Answering, ICCV Computer Vision Foundation, (2015), 2425-2433.*
(Continued)

*Primary Examiner* — Van C Mang
(74) *Attorney, Agent, or Firm* — Michael O'Keefe

(57) ABSTRACT

An example system includes a processor to learn a shared embedding space on unlabeled videos using speech visual correspondence. The processor can learn a number of additional embeddings including a question plus video embedding and an answer embedding using the shared embedding space to generate a trained visual question answering model. The processor can execute a visual question answering based on the trained visual question answering model.

17 Claims, 6 Drawing Sheets

(56)　　　　　References Cited

OTHER PUBLICATIONS

Xu et al., Jointly Modeling Deep Video and Compositional Text to Bridge Vision and Language in a Unified Framework, Proceedings of the Twenty-Ninth AAAI Conference on Artificial Intelligence, (2015), 2346-2352.*

Yu et al., A Joint Sequence Fusion Model for Video Question Answering and Retrieval, ECCV 2018 Computer Vision Foundation, (2018), 1-17.*

Kim et al., DeepStory: Video Story QA by Deep Embedded Memory Networks, 2017 (Year: 2017).*

Rezaeinia et al., Improving the Accuracy of Pre-trained Word Embeddings for Sentiment Analysis, 2017 (Year: 2017).*

Harwath, "Deep Multimodal Semantic Embeddings for Speech and Images", IEEE, 2015 (Year: 2015).*

Hu, Hexiang, et al., "Learning Answer Embeddings for Visual Question Answering", CVPR Jun. 2018, pp. 5428-5436.

Miech, Antoine, et al., "Howto100m: Learning a text-video embedding by watching hundred million narrated video clips", Proceedings of the IEEE International Conference on Computer Vision, Jul. 31, 2019, pp. 2630-2640.

Miech, Antoine, et al., "End-to-end learning of visual representations from uncurated instructional videos", arXiv preprint arXiv:1912.06430, Aug. 23, 2020, 14 pages.

Yang, Xitong, et al., "Deep multimodal representation learning from temporal data", CoRR, abs/1704.03152, Apr. 11, 2017, 9 pages.

Zeng, Kuo-Hao, et al., "Leveraging Video Descriptions to Learn Video Question Answering", Proceedings of the Thirty-First AAAI Conference on Artificial Intelligence, Feb. 2017, pp. 4334-4340.

Zhu, Linchao, et al., "ActBERT: Learning Global-Local Video-Text Representations", Proceedings of the IEEE/CVF Conference on Computer Vision and Pattern Recognition (CVPR), Jun. 2020, pp. 8746-8755.

Amrani et al., "Noise Estimation Using Density Estimation for Self-Supervised Multimodal Learning",Mar. 6, 2020, 17 pages.

* cited by examiner 102          104          106

108

<u>100</u>

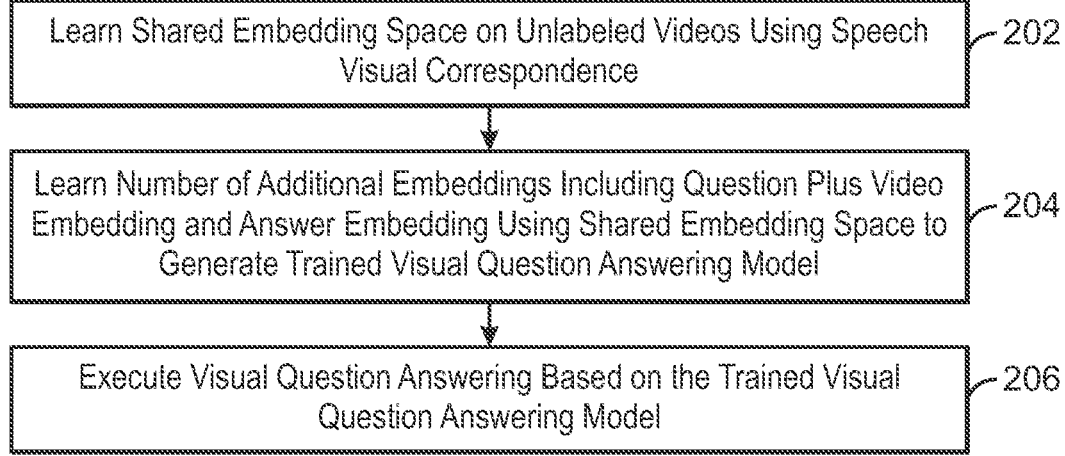

Learn Shared Embedding Space on Unlabeled Videos Using Speech Visual Correspondence ⟋202

Learn Number of Additional Embeddings Including Question Plus Video Embedding and Answer Embedding Using Shared Embedding Space to Generate Trained Visual Question Answering Model ⟋204

Execute Visual Question Answering Based on the Trained Visual Question Answering Model ⟋206

VISUAL QUESTION ANSWERING USING MODEL TRAINED ON UNLABELED VIDEOS

BACKGROUND

The present techniques relate to visual question answering. More specifically, the techniques relate to training models to perform visual question answering using unlabeled videos.

SUMMARY

According to an embodiment described herein, a system can include a processor to learn a shared embedding space on unlabeled videos using a speech visual correspondence. The processor can also further learn a plurality of additional embeddings comprising a question plus video embedding and an answer embedding using the shared embedding space to generate a trained visual question answering model. The processor can also execute a visual question answering based on the trained visual question answering model.

According to another embodiment described herein, a method can include learning, via a processor, a shared embedding space on unlabeled videos using a speech visual correspondence. The method can further include learning, via the processor, a plurality of additional embeddings comprising a question plus video embedding and an answer embedding using the shared embedding space to generate a trained visual question answering model. The method can also further include executing, via the processor, a visual question answering based on the trained visual question answering model.

According to another embodiment described herein, a computer program product for training visual question answering models can include computer-readable storage medium having program code embodied therewith. The computer readable storage medium is not a transitory signal per se. The program code executable by a processor to cause the processor to learn a shared embedding space on unlabeled videos using a speech visual correspondence. The program code can also cause the processor to learn a plurality of additional embeddings comprising a question plus video embedding and an answer embedding using the shared embedding space to generate a trained visual question answering model. The program code can also cause the processor to execute a visual question answering based on the trained visual question answering model.

BRIEF DESCRIPTION OF THE SEVERAL VIEWS OF THE DRAWINGS

FIG. 2 is a block diagram of an example method that can train a machine learning model to perform visual question answering using a shared embedding space learned on unlabeled videos;

DETAILED DESCRIPTION

Visual question answering (VQA) tasks include answering questions about videos or images presented in natural language. For example, an instance of VQA may include an input video or image and a free-form textual query regarding the content in the video or image, and an expected textual answer. Some VQA models may use a video and question as input, and the answer may be presented as the output of a long short-term memory (LSTM) unit or a softmax layer of a neural network over a set of predetermined answers. However, these types of architectures may not fully utilize the information that exists in coordinated text-video representations. For example, a text describing a video may be closely embedded to the embedding of the corresponding video. As used herein, an embedding refers to the mapping of features to vectors of real numbers. The distance between two embeddings may be measured using any suitable distance measurement, such as a Euclidean distance. Existing architectures may not be able to utilize the relationships between different modal spaces, such as speech and vision.

According to embodiments of the present disclosure, a visual question answering model can be trained using a shared embedding space learned on unlabeled videos in a shared embedding space. An example system includes a processor to learn a shared embedding space on unlabeled videos using speech visual correspondence. The processor can learn a number of additional embeddings including a question plus video embedding and an answer embedding using the shared embedding space to generate a trained visual question answering model. The processor can then execute a visual question answering based on the trained visual question answering model. Thus, embodiments of the present disclosure enable improved visual question answering performance using a shared embedding space that is learned from unlabeled videos in an automated manner without the need for annotation. The embodiments may thus leverage freely available videos to improve visual question answering models with minimal oversight.

Figure 1:
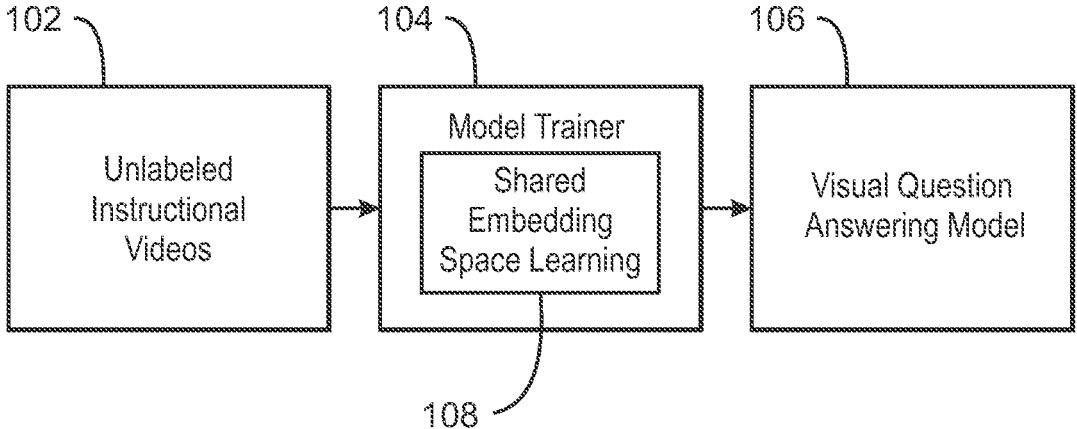
FIG. 1 is a block diagram of an example system for training a machine learning model using a shared embedding space learned on unlabeled videos.

With reference now to FIG. 1, a block diagram shows an example system for training a machine learning model using a shared embedding space learned on unlabeled videos. The example system is generally referred to by the reference number 100. FIG. 1 includes a set of unlabeled instructional videos 102. In various examples, the unlabeled instructional videos 102 may include captions. The system 100 includes a model trainer 104 shown receiving the unlabeled instruction videos 102. The system 100 also includes a visual question answering model 106 shown being trained by the model trainer 104. The model trainer 104 includes a shared embedding learning unit 108.

In the example of FIG. 1, a set of unlabeled instruction videos 102 may be provided to the model trainer 104. For example, the unlabeled instruction videos 102 may be selected from the HowTo100M narrated video dataset. The HowTo100M narrated video dataset includes over 1.2 million videos accompanied by automatically generated speech transcriptions. In various examples, the provided transcriptions can be used to create pairs of clip-captions defined by each caption time stamp. In some examples, each video clip shorter than five seconds can be extended symmetrically in time so that the duration is at least 5 seconds. In various examples, any subset of any suitable video dataset may be used alternatively, or in addition.

Still referring to FIG. 1, the shared embedding learning unit 108 may first execute a pre-training stage. For example, the shared embedding learning unit 108 can learn a shared embedding space with pre-training embeddings on the unlabeled instructional videos 102 using a speech visual correspondence. In various examples, the pre-training embeddings may include various speech and image embeddings. For example, for word representations in the captions, the shared embedding learning unit 108 can use a pre-trained word2vec embedding model, first released 2013. In various examples, for video clips, the shared embedding learning unit 108 can extract 2D features using ImageNet pre-trained Resnet-152, first released in 2015. For example, the 2D features may be extracted at a rate of one frame per second. In some examples, the shared embedding learning unit 108 can extract 3D features using a Kinetics pre-trained ResNeXt-101 16-frames, first released 2016. For example, the 3D features may be extracted at a rate of 24 frames per second. In various examples, after executing a temporal max pooling, the shared embedding learning unit 108 can concatenate 2D and 3D features to form a single feature vector per video clip.

The shared embedding learning unit 108 may then execute a training stage to learn a number of additional embeddings in the shared embedding space. For example, the additional embeddings may include a question plus video embedding and an answer embedding in the shared embedding space. In various examples, the additional embeddings may be learned using similar embedding models as used in the pre-training stage. For example, the shared embedding learning unit 108 can use a pre-trained word2vec embedding model may be used for word representations. Similarly, the shared embedding learning unit 108 can use an ImageNet pre-trained Resnet to extract 2D features and Kinetics pre-trained ResNeXt to extract 3D features. In various examples, the learning of the various embeddings may include the model trainer 104 learning a set of weights to be applied to the various embedding layers in the shared embedding space.

In various examples, the visual question answering model 106 may be used to perform visual questions answering or specific computer vision tasks. As one example, a question may include "what is the person holding?" and the answer may return as "a camera" in response to determining that the closest predetermined answer to the questions includes "camera." In various examples, computer vision tasks may include action recognition or object recognition tasks and image captioning or video captioning tasks. For example, an action recognition or object recognition task may include receiving a question with a particular action or object to detect and determining whether the action or object is within a video or image. As one example, the question may be "is there a camera in the image?" and the answer may be a confirmation or rejection such as "yes" or "no." An image captioning or video captioning task may include receiving an image or video without any captions, and generating captions for the provided image or video. For example, the caption "a person is taking pictures with a camera" may be generated for video depicting the same.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.). For example, the unlabeled instructional videos 102 may alternatively be other types of unlabeled videos.

FIG. 2 is a process flow diagram of an example method that can train a machine learning model to perform visual question answering using a shared embedding space learned on unlabeled videos. The method 200 can be implemented with any suitable computing device, such as the computing device 300 of FIG. 3 and is described with reference to the system 100 of FIG. 1. For example, the methods described below can be implemented by the computing device 300 the processor 602 of FIGS. 3 and 6.

At block 202, a shared embedding space is learned on unlabeled videos using a speech visual correspondence. For example, the unlabeled videos may be unlabeled instructional videos with captions. In various examples, the pre-training embeddings may include speech embeddings and vision embeddings. For example, the speech embeddings may include one or more speech or text features represented as scalar values in a feature vector. In various examples, the speech may be converted to text using any suitable technique. The vision embeddings may include video or image features represented as values in a feature vector. In various examples, the shared embedding space may be used by training the speech embeddings with the vision embeddings such that similar speech and images are embedded closer together. For example, a shared embedding space network layer that includes both speech and vision features in a single feature vector. In various examples, a max margin ranking loss function may be used to embed speech closer to a corresponding images in the shared embedding space.

At block 204, a number of additional embeddings including a question plus video embedding and an answer embedding are learned in the shared embedding space to generate a trained visual question answering model. For example, question plus video embeddings may be embedded closer to corresponding answer embeddings. In various examples, the additional embeddings may be learned using labeled data. For example, the labeled data may be questions and predetermined answers that are manually or automatically labeled using any suitable technique. In some examples, a max margin ranking loss function may be used to embed an answer closer to a corresponding question plus video in the shared embedding space.

At block 206, a visual question answering based on the trained visual question answering model is executed. For example, a question may be received that pertains to a visual component and an answer may be generated and displayed. In various examples, a nearest neighbor search may be executed over a set of predetermined answers in a shared question plus video and answer space. The answer generated may thus correspond to the predetermined answer closest to the received question in the shared question plus video and answer space.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. In various examples, the method 200 may include executing a computer vision task based on the trained visual question answering model. For example, the method 200 may include executing an action recognition or object recognition using the trained visual question answering model. In some examples, the method 200 may include executing an image captioning or video captioning using the trained visual question answering model.

In some scenarios, the techniques described herein may be implemented in a cloud computing environment. As discussed in more detail below in reference to at least FIGS. 3-6, a computing device configured to train a machine learning model to perform visual question answering using a shared embedding space learned on unlabeled videos may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
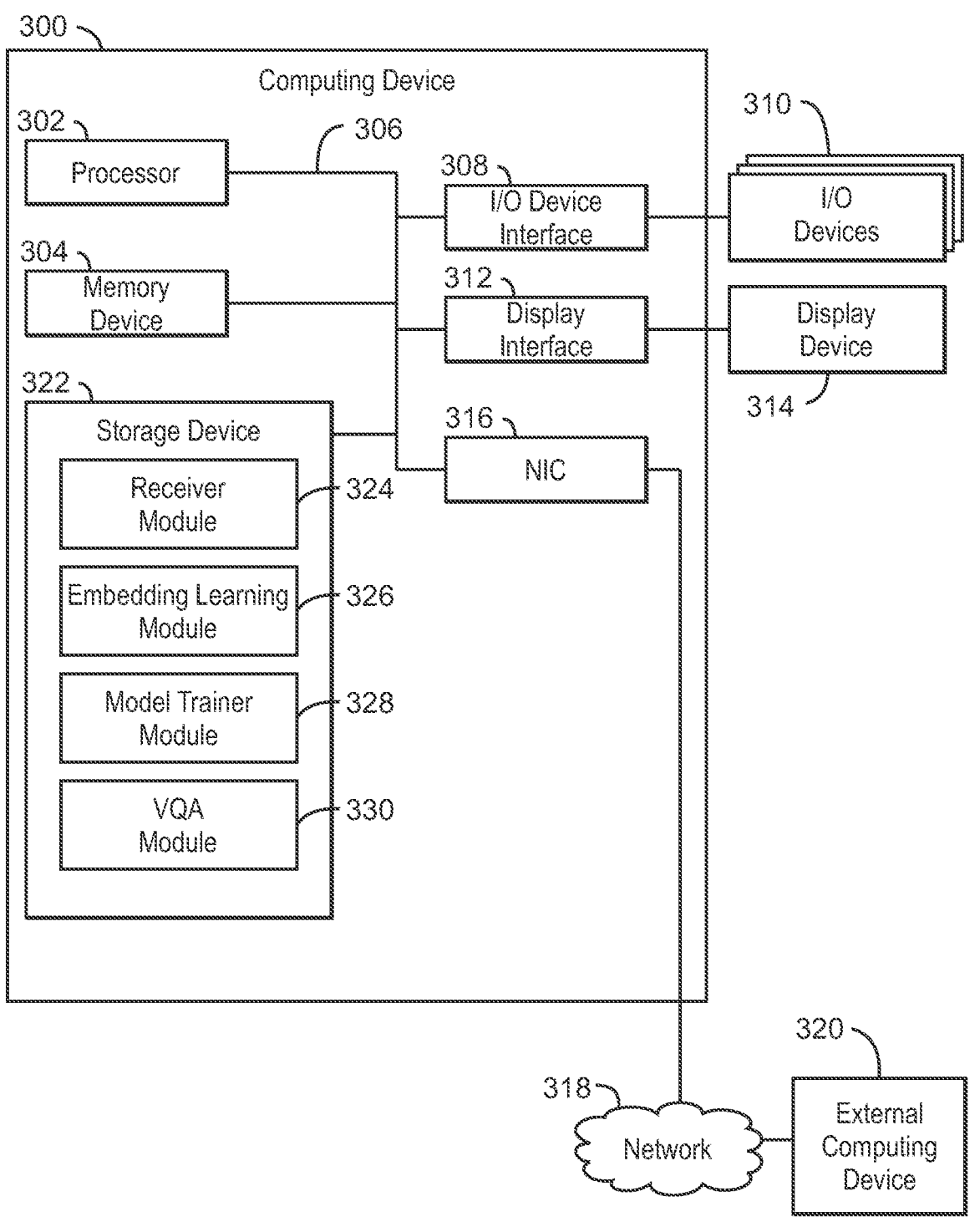
FIG. 3 is a block diagram of an example computing device that can train a machine learning model to perform visual question answering using a shared embedding space learned on unlabeled videos.

FIG. 3 is block diagram of an example computing device that can train a machine learning model to perform visual question answering using a shared embedding space learned on unlabeled videos. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external web-server 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a receiver module 324, an embedding learning module 326, a model trainer module 328, and a visual question answering (VQA) module 330. The receiver module 324 can receive a number of unlabeled videos. For example, the unlabeled videos may be unlabeled instructional videos including captions or transcripts with timestamps. The embedding learning module 326 can learn a shared embedding space on unlabeled videos using a speech visual correspondence. For example, the shared embedding space may include coordinated text-video representations. The model trainer module 328 can learn a number of additional embeddings including a question plus video embedding and an answer embedding using the shared embedding space to generate a trained visual question answering model. For example, the question plus video embedding and the answer embedding may each be a single feature vector in the shared embedding space. In various examples, the pre-training embeddings and the additional embeddings are included as embedding layers in a neural network. In some examples, the visual question answering model may be a neural network model. In various examples, the model trainer module 328 can train the visual question answering model using a max margin ranking loss function to embed an answer close to a corresponding question plus video in the shared embedding space. The VQA module 330 can execute a visual question answering based on the trained visual question answering model. For example, the VQA module 330 can execute a nearest neighbor search over a set of predetermined answers in a shared question plus video and answer space.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the receiver module 324, the embedding learning module 326, the model trainer module 328, and the VQA module 330, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the receiver module 324, the embedding learning module 326, the model trainer module 328, and the VQA module 330 can be implemented with logic, wherein the logic, as referred to herein, can include any suitable hardware (e.g., a processor, among others), software (e.g., an application, among others), firmware, or any suitable combination of hardware, software, and firmware.

Figure 4:
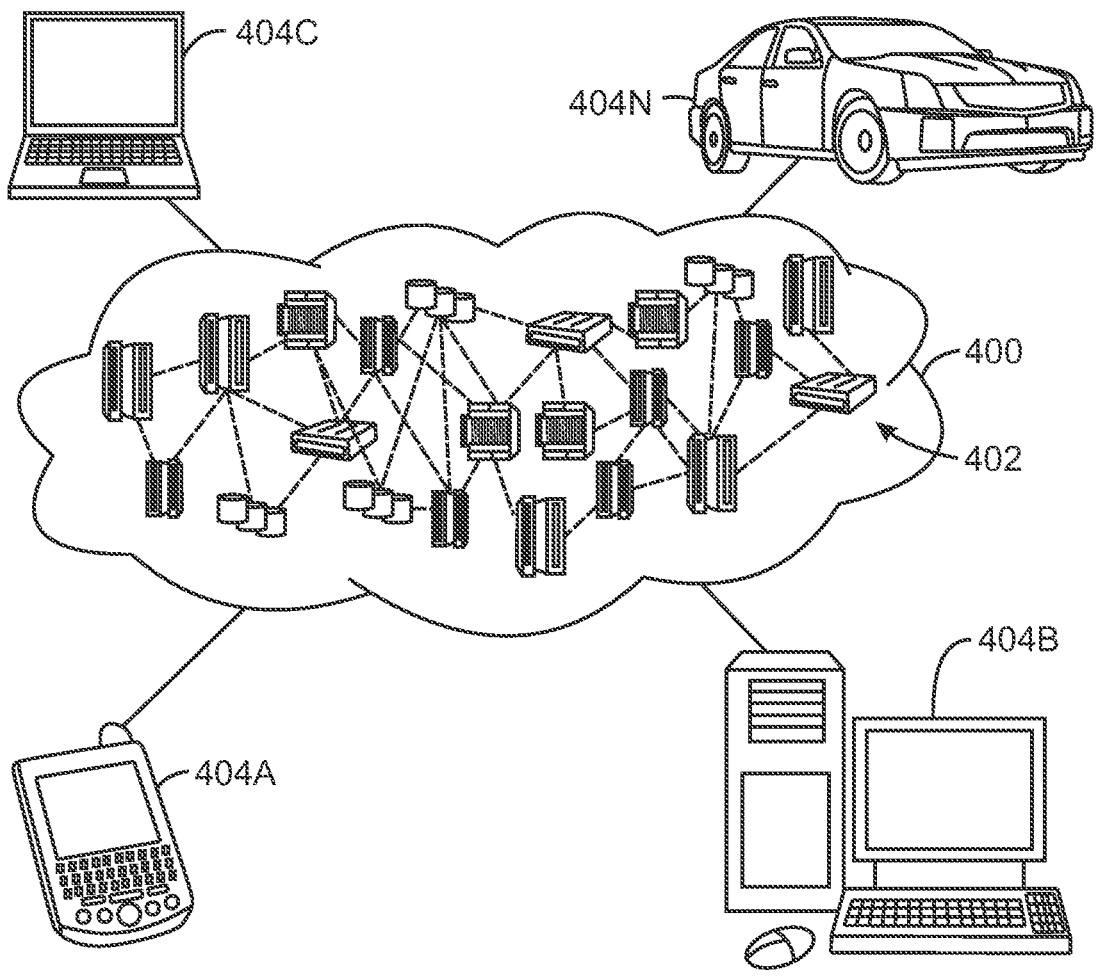
FIG. 4 is a diagram of an example cloud computing environment according to embodiments described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
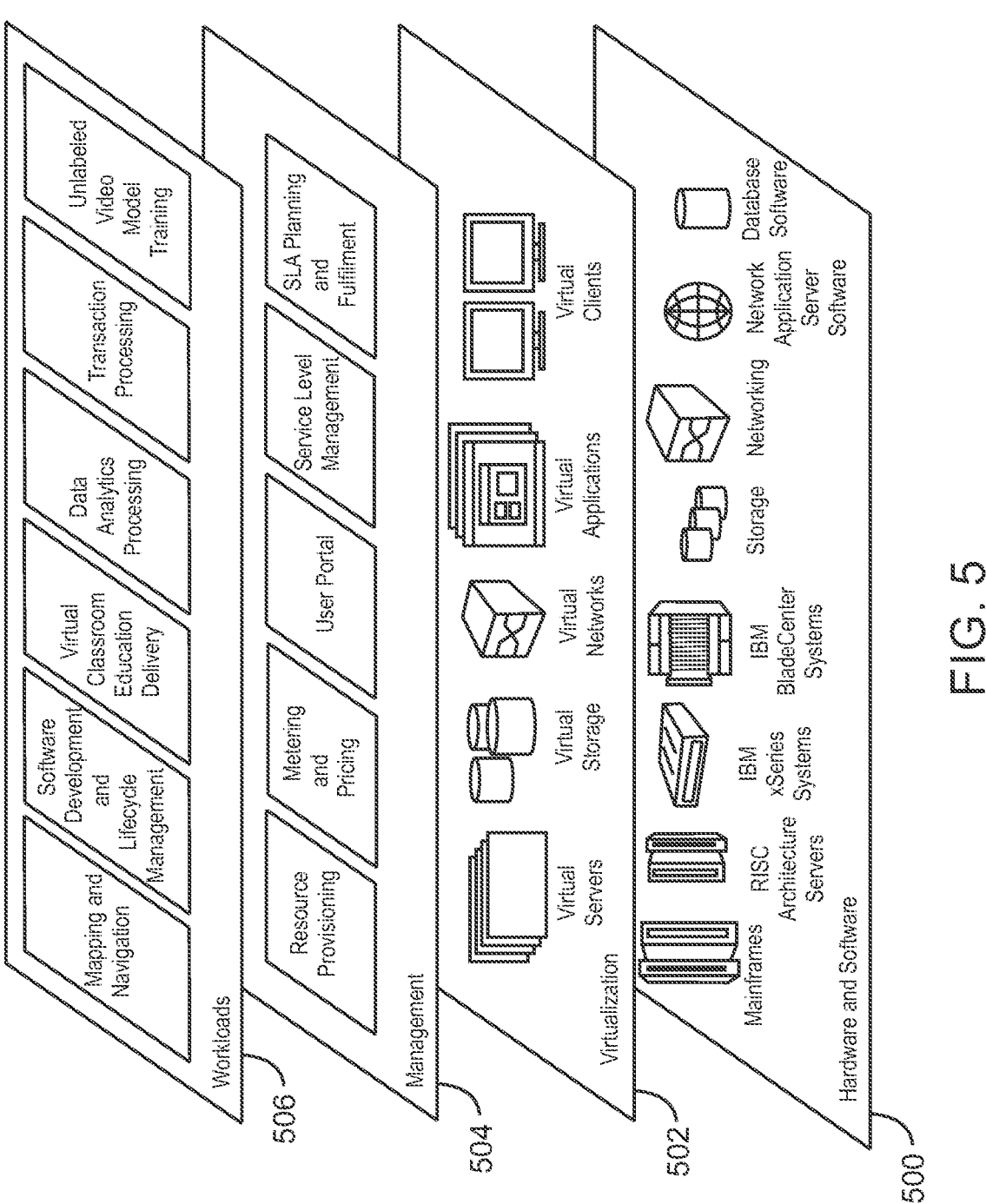
FIG. 5 is a diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and unlabeled video model training.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
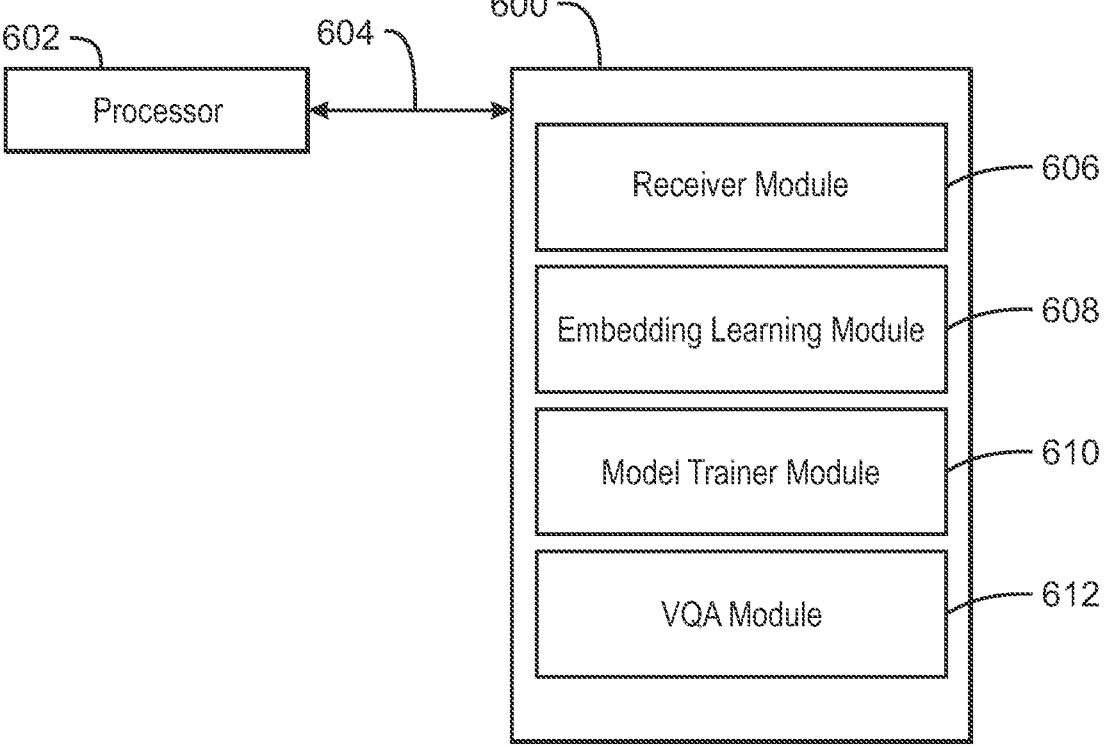
FIG. 6 is an example tangible, non-transitory computer-readable medium that can train a machine learning model to perform visual question answering using a shared embedding space learned on unlabeled videos.

Referring now to FIG. 6, a block diagram is depicted of an example tangible, non-transitory computer-readable medium 600 that can train a machine learning model to perform visual question answering using a shared embedding space learned on unlabeled videos. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 300 of FIG. 3.

The various software components discussed herein may be stored on the tangible, non-transitory, computer-readable medium 600, as indicated in FIG. 6. For example, a receiver module 606 includes code to receive a set of unlabeled videos. For example, the unlabeled videos may be unlabeled instructional videos including captions with timestamps corresponding to audio in the videos. An embedding learning module 608 includes code to learn a shared embedding space on unlabeled videos using a speech visual correspondence. A model trainer module 610 includes code to learn a number of additional embeddings including a question plus video embedding and an answer embedding using the shared embedding space to generate a trained visual question answering model. For example, the model trainer module 610 may include code to embed question plus video embeddings closer to corresponding answer embeddings. In some examples, the model trainer module 610 includes code to use a max margin ranking loss function to embed an answer closer to a corresponding question plus video in the shared embedding space. A visual question answering (VQA) module 612 includes code to execute a visual question answering based on the trained visual question answering model. For example, the VQA module 612 may include code to execute a nearest neighbor search over a set of predetermined answers in a shared question plus video and answer space. It is to be understood that any number of additional software components not shown in FIG. 6 may be included within the tangible, non-transitory, computer-readable medium 600, depending on the particular application. For example, a computer vision module may be included to execute a computer vision task based on the trained visual question answering model. For example, the computer vision module can execute an action recognition or object recognition using the trained visual question answering model. In some examples, the computer vision module can execute an image captioning or video captioning using the trained visual question answering model.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:

pre-train a machine learning model to learn a shared embedding space on unlabeled videos using a speech visual correspondence, wherein an ImageNet pre-trained Resnet is used to extract 2D features from the unlabeled videos, and wherein a Kinetics pre-trained ResNeXt is used to extract 3D features from the unlabeled videos, and wherein the shared embedding space comprises a network layer with both speech and vision features in a single feature vector, and wherein training the shared embedding space with vision embeddings embeds similar speech and images within a threshold proximity;

train the machine learning model to learn a plurality of additional embeddings comprising a question plus video embedding and an answer embedding using the shared embedding space to generate a trained visual question answering model, wherein the plurality of additional embeddings comprise word representations learned using a pre-trained word2vec embedding model; and executing the trained visual question answering model, wherein the executing comprises a nearest neighbor search over a set of predetermined answers in a shared question plus video and answer space.

2. The system of claim 1, wherein the shared embedding space comprises coordinated text-video representations.

3. The system of claim 1, wherein the processor is configured to train the visual question answering model using a max margin ranking loss function to embed an answer close to a corresponding question plus video in the shared embedding space.

4. The system of claim 1, wherein the question plus video embedding and the answer embedding each comprise a single feature vector.

5. The system of claim 1, wherein the visual question answering model comprises a neural network model.

6. The system of claim 1, wherein the additional embeddings comprise embedding layers of a neural network.

7. A computer-implemented method, comprising:

pre-training a machine learning model to learn, via a processor, a shared embedding space on unlabeled videos using a speech visual correspondence, wherein an ImageNet pre-trained Resnet is used to extract 2D features from the unlabeled videos, and wherein a Kinetics pre-trained ResNeXt is used to extract 3D features from the unlabeled videos, and wherein the shared embedding space comprises a network layer with both speech and vision features in a single feature vector, and wherein training the shared embedding space with vision embeddings embeds similar speech and images within a threshold proximity;

train the machine learning model to learn, via the processor, a plurality of additional embeddings comprising a question plus video embedding and an answer embedding using the shared embedding space to generate a trained visual question answering model, wherein the plurality of additional embeddings comprise word representations learned using a pre-trained word2vec embedding model; and executing the trained visual question answering model, wherein the executing comprises a nearest neighbor search over a set of predetermined answers in a shared question plus video and answer space.

8. The computer-implemented method of claim 7, wherein learning the question plus video embedding comprises training the visual question answering model on labeled data.

9. The computer-implemented method of claim 7, wherein training the visual question answering model comprises using a max margin ranking loss function to embed an answer with a reduced distance to a corresponding question plus video in the shared embedding space.

10. The computer-implemented method of claim 7, wherein learning the question plus video embedding comprises embedding question plus video embeddings with a reduced distance to corresponding answer embeddings.

11. The computer-implemented method of claim 7, wherein executing the visual question answering comprises executing an action recognition or object recognition using the trained visual question answering model.

12. The computer-implemented method of claim 7, wherein executing the visual question answering comprises executing an image captioning or video captioning using the trained visual question answering model.

13. A computer program product for training visual question answering models, the computer program product comprising a computer-readable storage medium having program code embodied therewith, the program code executable by a processor to cause the processor to:

pre-train a machine learning model to learn a shared embedding space on unlabeled videos using a speech visual correspondence, wherein an ImageNet pre-trained Resnet is used to extract 2D features from the unlabeled videos, and wherein a Kinetics pre-trained ResNeXt is used to extract 3D features from the unlabeled videos, and wherein the shared embedding space comprises a network layer with both speech and vision features in a single feature vector, and wherein training the shared embedding space with vision embeddings embeds similar speech and images within a threshold proximity;

train the machine learning model to learn a plurality of additional embeddings comprising a question plus video embedding and an answer embedding using the shared embedding space to generate a trained visual question answering model, wherein the plurality of additional embeddings comprise word representations learned using a pre-trained word2vec embedding model; and executing the trained visual question answering model, wherein the executing comprises a nearest neighbor search over a set of predetermined answers in a shared question plus video and answer space.

14. The computer program product of claim 13, further comprising program code executable by the processor to train the visual question answering model on labeled data.

15. The computer program product of claim 13, further comprising program code executable by the processor to use a max margin ranking loss function to embed an answer with a reduced distance to a corresponding question plus video in the shared embedding space.

16. The computer program product of claim 13, further comprising program code executable by the processor to embed question plus video embeddings with a reduced distance to corresponding answer embeddings.

17. The computer program product of claim 13, further comprising program code executable by the processor to execute a computer vision task based on the trained visual question answering model.

\* \* \* \* \*